US008370915B2

(12) United States Patent
Carter

(10) Patent No.: US 8,370,915 B2
(45) Date of Patent: Feb. 5, 2013

(54) IDENTITY ENABLED VIRTUALIZED EDGE PROCESSING

(75) Inventor: Stephen R. Carter, Spanish Fork, UT (US)

(73) Assignee: Oracle International Corporation, Redwood City, CA (US)

( * ) Notice: Subject to any disclaimer, the term of this patent is extended or adjusted under 35 U.S.C. 154(b) by 1183 days.

(21) Appl. No.: 11/692,302

(22) Filed: Mar. 28, 2007

(65) Prior Publication Data

US 2008/0098462 A1  Apr. 24, 2008

Related U.S. Application Data

(63) Continuation-in-part of application No. 11/583,667, filed on Oct. 19, 2006.

(51) Int. Cl.
*H04L 29/06* (2006.01)
(52) U.S. Cl. .......................................... 726/10
(58) Field of Classification Search .................. 726/8, 10
See application file for complete search history.

(56) References Cited

U.S. PATENT DOCUMENTS

| | | | |
|---|---|---|---|
| 5,619,657 A | 4/1997 | Sudama et al. | |
| 5,684,950 A | 11/1997 | Dare et al. | |
| 5,832,487 A | 11/1998 | Olds et al. | |
| 6,014,667 A | 1/2000 | Jenkins et al. | |
| 6,157,925 A | 12/2000 | Jenkins et al. | |
| 6,647,422 B2 * | 11/2003 | Wesinger et al. | 709/228 |
| 6,778,498 B2 | 8/2004 | McDysan | |
| 6,829,654 B1 | 12/2004 | Jungck | |
| 7,058,720 B1 | 6/2006 | Majidimehr | |
| 7,117,535 B1 | 10/2006 | Wecker | |
| 7,496,757 B2 * | 2/2009 | Abbott et al. | 713/176 |
| 7,685,206 B1 | 3/2010 | Mathew et al. | |
| 7,698,400 B1 | 4/2010 | Beloussov et al. | |
| 2002/0075306 A1 | 6/2002 | Thompson et al. | |
| 2002/0138666 A1* | 9/2002 | Fujisawa | 709/330 |
| 2003/0088574 A1 | 5/2003 | White et al. | |
| 2004/0230799 A1 | 11/2004 | Davis | |
| 2004/0259277 A1 | 12/2004 | Hofmeister | |
| 2005/0246708 A1 | 11/2005 | Turner et al. | |
| 2005/0289471 A1 | 12/2005 | Thompson et al. | |
| 2006/0050888 A1 | 3/2006 | Svensson | |
| 2006/0144927 A1 | 7/2006 | Love et al. | |
| 2006/0200424 A1 | 9/2006 | Cameron et al. | |
| 2006/0212934 A1 | 9/2006 | Cameron et al. | |
| 2007/0089111 A1* | 4/2007 | Robinson et al. | 718/1 |
| 2007/0094348 A1* | 4/2007 | Scheidel et al. | 709/217 |
| 2008/0082976 A1* | 4/2008 | Steinwagner et al. | 718/1 |
| 2008/0098457 A1 | 4/2008 | Carter | |

FOREIGN PATENT DOCUMENTS

| | | |
|---|---|---|
| WO | WO-0069110 | 11/2000 |
| WO | WO-0182023 A2 | 11/2001 |
| WO | WO-02071191 A2 | 9/2002 |

OTHER PUBLICATIONS

"European Patent Application Serial No. 07117394.2 Extended European Search Report dated Aug. 25, 2008", 9 pgs.

\* cited by examiner

*Primary Examiner* — Jeffrey D Popham
(74) *Attorney, Agent, or Firm* — Osha Liang LLP

(57) ABSTRACT

Techniques for identity enabled virtualized edge processing are provided. A target service, its data content, and its processing context are packaged with an identity as a self-contained virtual distribution within an enterprise environment and distributed to a host environment in accordance with distribution policy. The host environment represents an edge of a network, and the virtual distribution's identity is validated and the virtual distribution is subsequently deployed as a virtual machine at the edge in accordance with deployment policy.

20 Claims, 5 Drawing Sheets

IDENTITY ENABLED VIRTUALIZED EDGE PROCESSING

RELATED APPLICATION

The present invention is co-pending with and is a Continuation-In-Part of U.S. application Ser. No. 11/583,667 entitled "Identity Controlled Data Center," filed on Oct. 19, 2006; the disclosure of which is incorporated by reference herein.

FIELD

The invention relates generally to security and more particularly to techniques for identity enabled virtualized edge processing.

BACKGROUND

The content of the Internet is rapidly overcoming both its physical infrastructure and its existing content management mechanisms. In fact, it was recently announced that a major data center was to be built within several miles of a hydroelectric dam so that more power can be available for the data center. It is interesting to note that today's use of the Internet and content provisioning for Internet users have made voltage and power drop from a power source to a data center a significant loss that should be captured by relocating the data center.

Likewise, the management of Internet content is becoming a problem. Not only is the power needed to operate the required disks, but management of the content is a problem. A standard method of distributing content and providing more prompt access to the content by the user is called edge computing. Edge computing involves distributing computing resources throughout the network so that computing power and Internet content are "close" or in "proximity" to the user. This provides both faster access mechanisms to the user and provides more points of access to the content so that that access loads associated with the content can be spread out.

The problem is that more and more of content requires security access control processing, content manipulation processing, etc., such that the content needs to be manipulated in some manner at the edge rather than just made available. This is especially the case when certain kinds of markets are contemplated. For example, video on demand (VOD) may provide a discount for access to entertainment content if a user agrees to view several entertainment trailers. The user hopes to see the movie at a discount and the vendor hopes that the user will choose to watch one of the new movies as a result of watching the trailer. However, the processing resources needed, in relation to each unique offer as it applies to various content, provides a challenge for the vendor.

This need for more content and more computing power using a traditional data center model is outstripping the ability to provide resources. Even with the advent of multi-core Central Processing Units (CPU's) decreasing the draw on power and the production of heat; one still finds the content and processing densities increasing beyond an overload point.

Consequently, there is a need for improved edge computing with security-enhanced features.

SUMMARY

In various embodiments, techniques for identity enabled virtualized edge processing are provided. More specifically, and in an embodiment, a method is provided for packaging and distributing a virtual distribution. A service and content are imaged as a virtual distribution. An identity for the virtual distribution is acquired and the identity is packaged with the virtual distribution. Next, policy is enforced to determine when the virtual distribution is to be transmitted over a wide area network (WAN) to the target physical hosting environment for installation. Furthermore, when the virtual distribution is installed on the target physical hosting environment it processes as a self-contained virtual machine (VM) having the service and the content.

DETAILED DESCRIPTION

Figure 1:
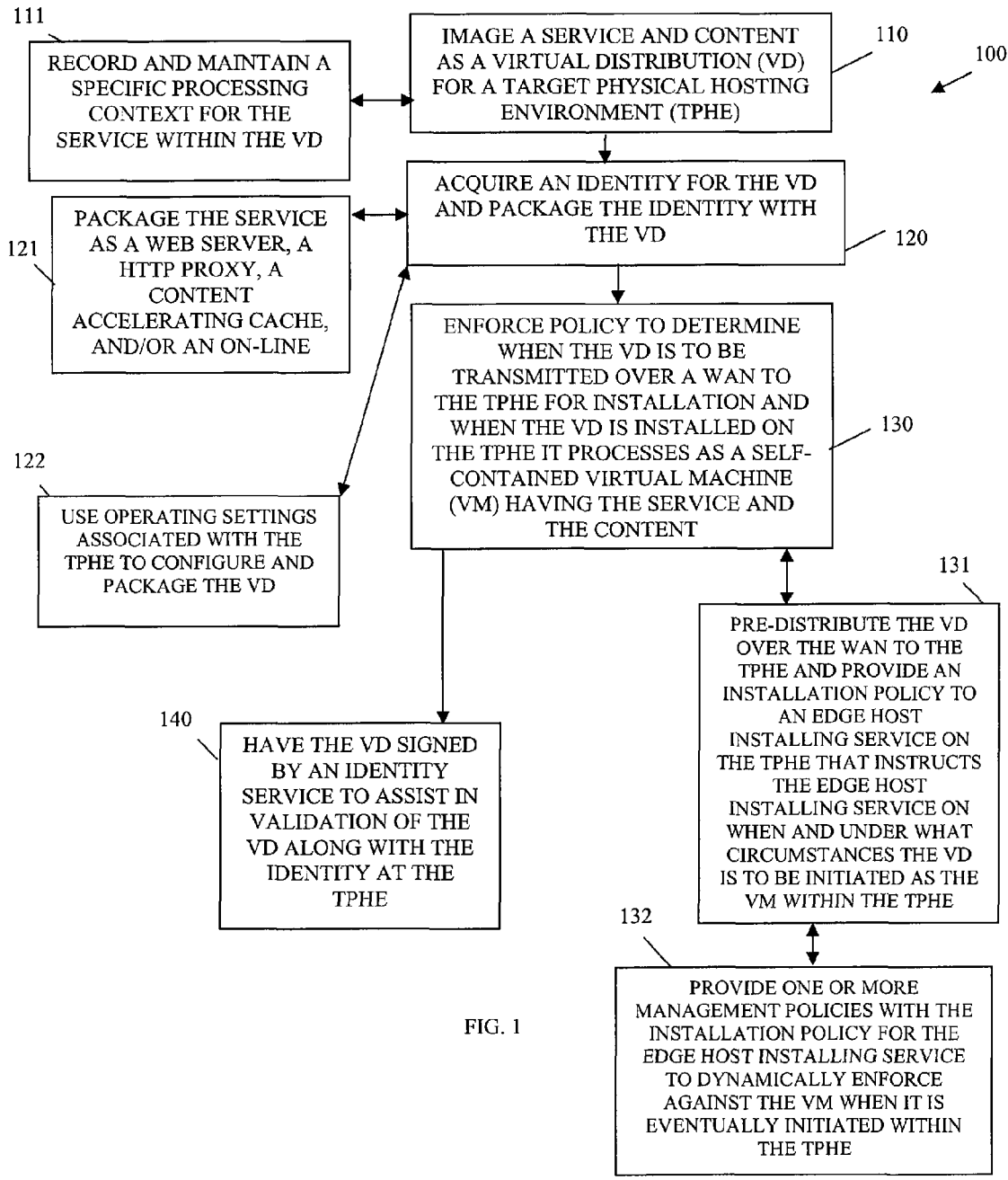
FIG. 1 is a diagram of a method for packaging and distributing a virtual distribution, according to an example embodiment.

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A "virtual processing environment" refers to a software constructed sub processing environment that is carved out from or superimposed on a portion of a physical processing environment. A single physical processing environment can have a plurality of different or cloned "virtual processing environments."

The processing environments (physical and virtual) as used herein are configured to participate in a virtualized data center. A "virtualized data center" refers to a platform or environment for executing one or more similar services or applications. For example, an enterprise may deploy a suite of services for use; some of the service may be related to administration, audit tracking, security, maintenance, etc. of other ones of the deployed services. Thus, the platform or environment can include a variety of services, some of which may share features and some of which may be independent of the other services.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "temporary access token" as used herein refers to a temporary identity supplied to a resource for temporary use until a more permanent identity can be established. Furthermore, as used herein a "service provider" (SP) refers to a special type of service or resource that utilizes identities vended by a trusted identity service on behalf of other resources.

An "orchestration service" is another specialized resource or service that provides a mechanism for orchestrating the deployment, cloning, moving, terminating, etc. of virtual processing environments included within a physical processing environment.

An example of a virtualized data center that is identity based and provides increased security beyond what has been known in conventional approaches may be found in U.S. application Ser. No. 11/583,667 entitled "Identity Controlled Data Center," filed on Oct. 19, 2006; the disclosure of which is incorporated by reference herein.

Embodiments of the present invention are improvements to the "Identity Controlled Data Center," which provide for identity-enabled virtualized edge processing.

A "virtual machine" (VM) may be viewed as a virtual processing environment discussed and described above. The VM is a logical machine that is independent of its physical process environment or physical machine. It may include its own operating system (OS), its own file system (FS), its own directory services, etc., which may each be different from the physical processing environment.

A VM may also be referred to herein as a "virtual distribution." That is, a virtual distribution is instantiated or started on a physical processing environment or machine to start a VM. Similarly, a physical processing environment may be referred to as a "physical distribution."

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

FIG. 1 is a diagram of a method 100 for packaging and distributing a virtual distribution, according to an example embodiment. The method 100 (hereinafter "packaging and distribution service") is implemented as instructions in a machine-accessible and readable medium. The instructions when executed by a machine perform the processing depicted in FIG. 1. The packaging and distribution service is also operational over and processes within a network. The network may be wired, wireless, or a combination of wired and wireless.

At 110, the packaging and distribution service images a service and content as a virtual distribution for a target physical hosting environment or physical distribution. In an embodiment, at 111, this may entail recording and maintaining a specific processing context for the service within the virtual distribution. The packaging and distribution service utilizes the Identity Controlled Data Center techniques described and incorporated by reference above. Thus, interaction with the target physical hosting environment may be used to acquire operating data, such as resources, etc. and other configuration data about the target environment for use in defining the virtual distribution. In some cases, such operating and configuration data may be housed in a repository and associated with the target environment, such that dynamic interaction is not required. In other cases, dynamic interaction with the target environment occurs to acquire operating and configuration data for the virtual distribution.

The packaging and distribution service maintains a context or state for the service and its content within the image that represents the virtual distribution. So, when the virtual distribution is subsequently installed and instantiated as a virtual machine (VM) on the target physical environment, the service and its content can run or resume processing from the context or state captured when the packaging and distribution service imaged it. This has a variety of beneficial uses. For example, applications or services not available on the target physical processing environment can be automatically made available and processed to a particular context or state, such that users on the target environment can interact and assist in processing the applications or services. This provides for novel collaboration opportunities without requiring the assistance of technical staff to install and configure specific applications or services, since the desired applications and services reside in the virtual distribution and (as will be described more completely herein and below) can be automatically installed and initiated as a VM on a particular users physical machine or physical processing environment.

At 120, the packaging and distribution service acquires an identity for the virtual distribution and that identity is packaged with the virtual distribution image. Examples of associating an identity with a virtual processing environment or a virtual distribution were described in detail with the Identity Controlled Data Center Techniques already incorporated by reference herein.

In an embodiment, at 121, the packaging and distribution service may package the service as a world-wide web (WWW) service, a Hypertext Transfer Protocol (HTTP) proxy, a content acceleration cache, an online commerce service, etc. For example, a web server may include time sensitive content that is associated with either new or existing dynamic web pages, such that when the virtual distribution is populated and instantiated as a particular VM on a target environment content unique to the virtual distribution is made available. The availability of that content can be controlled by policy.

In still another example, an HTTP proxy may include time sensitive content that is associated with a site accelerating proxy, such that when the virtual distribution is populated and instantiated as a particular VM on a target environment previously cached content to be made available. This technique is superior to "pinning" or "pre-positioning" content in a proxy environment because it is possible for a very active proxy to either move content that has been pre-positioned for a user out of the cache because of cache freshness policy or the proxy becomes less responsive because the cache working set has become too small because of the amount of content that has been pre-positioned. Here, the cache can be pre-loaded and then "frozen" or held in abeyance as content associated with the virtual distribution, which leaves existing operational proxies alone to function as they are expected to function and yet still provide the increased speed of cached content by starting the VM representing the virtual distribution in the target environment. Note also that if the virtual distribution is made part of a cache hierarchy that operational caching proxies can then load from the virtual distribution image, but just when the virtual distribution is in fact active. Again, the service and content of the virtual distribution image is controlled by the subsequent processing environment (target physical processing environment).

In another example, an online commerce service may be embodied in the virtual distribution. Here, such a service may include special offers or updated logic for commerce processing, all of which is packaged within the virtual distribution image by the packaging and distribution service. When the virtual distribution is subsequently initiated in the target environment the special offers or updated logic are allowed to insert into request or event chains so that new options are available at the time and for the right audience without any changes to existing mechanisms. So, a movie trailer may be viewed for a user to have an opportunity to achieve a discount on a media purchase and this can be done without changes to existing processing mechanisms.

In short, the packaging and distribution service creates the initial virtual distribution image for purposes of encapsulating a service (or multiple services) as a complete authoritative execution environment for associated data/content. As will be seen more completely below, this virtual distribution is verifiable by its identity and can be subsequently deployed as a VM on one or more target physical processing environments by network edge services in accordance with deployment policies.

According to an embodiment, at 122, the packaging and distribution service may use operational settings associated with the target physical hosting environment to configure and initially package the virtual distribution image. The target environment may also be referred to herein as the target hosting environment or just hosting environment.

At 130, the packaging and distribution service enforces policy to determine when the virtual distribution is to be transmitted over a wide-area network (WAN) to the target physical hosting environment. It is noted that when the virtual distribution is installed and initiated as VM on the hosting environment that it operates as a self-contained VM having the service and the content imaged by the packaging and distribution service.

In some cases, at 131, the packaging and distribution service may pre-distribute the virtual distribution over the WAN to the hosting environment and provide an installation or deployment policy to an edge host installing service on the hosting environment. The deployment policy instructs the edge host installing service on when and under what circumstances the virtual distribution is to be initiated as the VM within the target physical hosting environment. In some cases, the deployment policy is acquired via an identity service when the edge host installing service authenticates the virtual distribution's identity within the hosting environment. In other cases, the deployment policy is supplied via a policy decision point (PDP) service that an identity service identifies for the edge host installing service. Thus, the manner in which the edge host installing service discovers and acquires the deployment policy can vary.

In addition, at 132, the packaging and distribution service may provide one or more management policies with the installation or deployment policy for the edge host installing service to use in managing the VM in the host environment. Again, the manner in which the edge host installing service discovers and acquires the management policies can vary as described above. Moreover, the edge host installing service dynamically enforces the management policies against the VM when the VM is eventually initiated within the target physical hosting environment.

In an embodiment, at 140, the packaging and distribution service may also have the virtual distribution signed by a trusted third-party service, such as an identity service.

Examples of identity services were provided in detail above and were incorporated by reference herein. The signature of the identity service permits the verification of the virtual distributions configuration and ensures that tampering has not occurred when the edge host installing service receives the virtual distribution. The identity service also assist in validating the identity of the virtual distribution, the details of this were discussed in detail with the Identity Controlled Data Center Techniques incorporated by reference herein.

Figure 2:
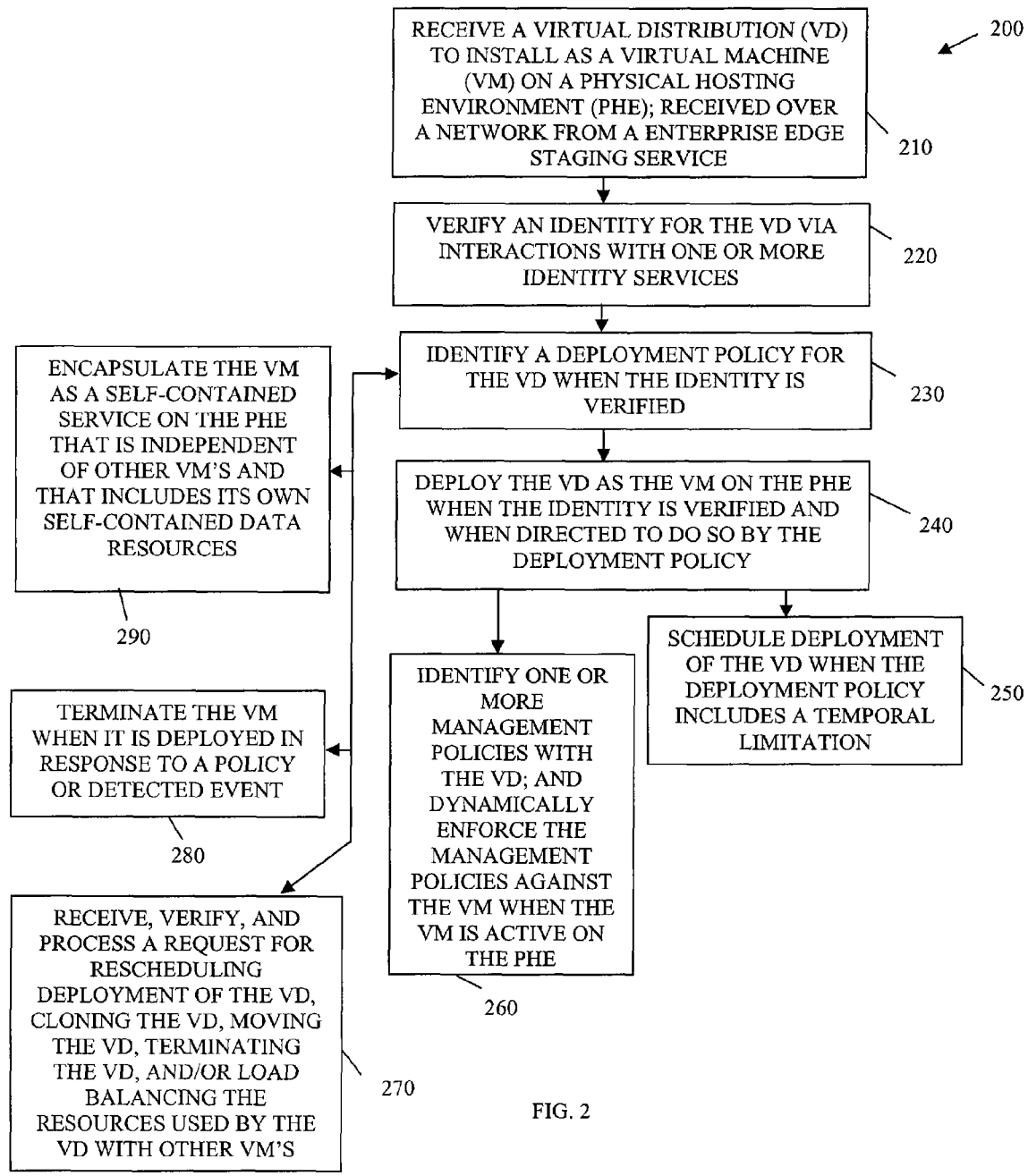
FIG. 2 is a diagram of method for deploying a virtual distribution within a hosting environment, according to an example embodiment.

FIG. 2 is a diagram of method 200 for deploying a virtual distribution within a hosting environment, according to an example embodiment. The method 200 (hereinafter "deployment service" is implemented in a machine-accessible and readable medium as instructions. The instructions when executed by a machine perform the processing depicted in the FIG. 2. Moreover, the deployment service is operational over a network, and the network may be wired, wireless, or a combination of wired and wireless.

The deployment service communicates with the packaging and distribution service represented by the method 100 of the FIG. 1 to receive virtual distributions for subsequent deployment and management. In this manner, the deployment service may be viewed as an instance of an edge host installation or deployment service that was discussed above with reference to the packaging and distribution service represented by the method 100 of the FIG. 1.

At 210, the deployment service receives a virtual distribution to install as a virtual machine (VM) on a physical hosting environment. The deployment service also processes within the physical hosting environment; although it is understood that the physical hosting environment may include a plurality of physical machines such that the VM is deployed on a different machine than the deployment service. However, in some cases, both the VM and the deployment service may be deployed and operational on a same machine within the physical hosting environment.

At 220, the deployment service verifies the identity for the virtual distribution via interactions with one or more identity services. Such a technique was described in detail in the Identity Controlled Data Center application, which was incorporated by reference herein. Essentially, a local hosting environment identity service may be used to acquire a temporary token or id from the virtual distribution and have it verified or validated by a remote identity service over a WAN associated with an environment in which the packaging and distribution service operates (discussed above with reference to the method 100 of the FIG. 1). If validated, the local hosting environment identity service supplies a unique identity within the hosting environment under which the virtual distribution of the VM may operate and be verified.

At 230, the deployment service identifies a deployment policy for the virtual distribution when the identity of the virtual distribution is verified or validated, at 220. Again, the deployment policy may be acquired from the local identity service, from the remote identity service, from a policy repository local or remote to the hosting environment, and/or from configuration data associated with the virtual distribution.

At 240, the deployment service deploys the virtual distribution on the physical hosting environment when the identity is verified and when it is directed to do so according to the tenets or strictures of the deployment policy. In some cases, at 250, the deployment policy may direct the deployment service to schedule the virtual distribution to be deployed or initiated as VM within the hosting environment on a specific calendar date and time or after a specific elapsed period of time. This may be done when the deployment policy includes one or more temporal limitations.

According to an embodiment, at 260, the deployment service may identify one or more management policies with the virtual distribution. These may include actions for the deployment service to dynamically enforce against the VM when it is activated within the target physical hosting environment. So, the deployment service may be used to dynamically manage the life cycle of the VM in addition to the initial deployment within the hosting environment.

In some cases, at 270, the deployment service may receive, verify, and process a request received from an authorized resource that alters the VM in some manner. For example, a request can cause the deployment service to: reschedule an already scheduled virtual distribution deployment; clone the virtual distribution within the host environment; move the virtual distribution to another different host environment (in such case the image of the VM is captured in the manner discussed above with respect to method 100 of the FIG. 1); terminate the virtual distribution; load balance resources used by the virtual distribution by other VM's processing within the hosting environment; etc.

For example, at 280, the deployment service may terminate the VM when it already active and deployed upon the detection of a satisfied policy that permits or directs termination or a detected event that necessitates termination.

Essentially, at 290, the deployment service encapsulates the VM as a self-contained service on the physical hosting environment that is independent of other VM's and that includes its own verifiable identity and its own self-contained data resource and content.

Figure 3:
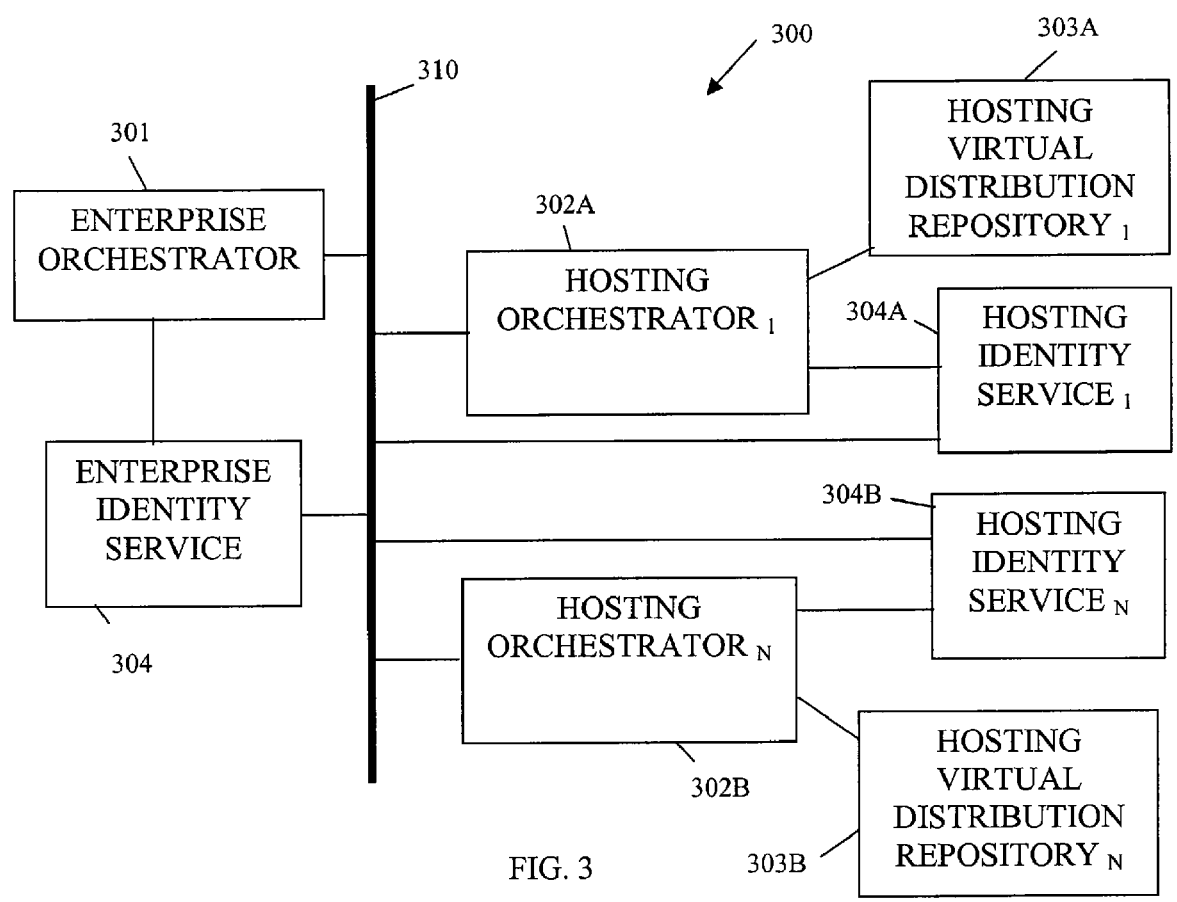
FIG. 3 is a diagram of a virtual distribution packaging and deployment system, according to an example embodiment.

FIG. 3 is a diagram of a virtual distribution packaging and deployment system 300, according to an example embodiment. The virtual distribution packaging and deployment system 300 is implemented as instructions on or within a machine-accessible and readable medium. The instructions when executed by one or more machines perform the processing depicted in the methods 100 and 200 of the FIGS. 1 and 2, respectively. The virtual distribution packaging and deployment system 300 is operational over a network 310 that may be wired, wireless, or a combination of wired and wireless.

The virtual distribution packaging and deployment system 300 includes an enterprise orchestrator 301 and one or more hosting orchestrators 302A and 302B. The virtual distribution packaging and deployment system 300 may also include one or more hosting virtual distribution repositories 303A and 303B, an enterprise identity service 304, and one or more hosting identity services 304A and 304B. Each of these and there interactions with one another will now be discussed in turn.

The enterprise orchestrator 301 is implemented in a machine-accessible and readable medium and is to process on an enterprise machine (processing device). Example processing and features of an enterprise orchestrator 301 was provided in detail above with reference to the packaging and distribution service represented by the method 100 of the FIG. 1.

The enterprise orchestrator 301 is to securely package and distribute one or more virtual distributions. Each virtual distribution includes its own identity that can be subsequently validated or verified, perhaps via an enterprise identity service 304 (discussed below). The enterprise orchestrator 301 packages a particular virtual distribution as a self-contained environment for a target service and its content. In some cases, the configuration of the virtual distribution can be signed by the enterprise identity service 304. The enterprise orchestrator 301 communicates or deploys the virtual distributions to particular hosting environments or particular hosting orchestrators 302A or 302B over a wide area network (WAN) 310. So, the enterprise orchestrator 301 is remote from the hosting environments and each of the hosting orchestrators 302A and 302B.

In an embodiment, the enterprise orchestrator 301 captures and images a particular processing context of the target service within the one or more virtual distributions. In other words, a processing state may be captured and imaged as the virtual distributions for a particular target service or even set of services. In some cases, the target service may be associated with a WWW server service, a HTTP proxy service, a content acceleration caching service, an online commerce service, etc.

The enterprise orchestrator 301 deploys the virtual distributions in accord with deployment policy. In some situations, a virtual distribution may be pre-distributed well in advance of a scheduled deployment within a particular hosting environment.

Each hosting orchestrator 302A and 302B communicates over the WAN 310 with the enterprise orchestrator 301 to receive a virtual distribution. Example processing and features associated with the hosting orchestrators 302A and 302B were provided in detail above with the method 200 of the FIG. 2.

Each hosting orchestrator 302A and 302B is implemented in a machine-accessible and readable medium and is to process on a particular hosting machine within its particular hosting environment. Each hosting orchestrator 302A and 302B is used to deploy received virtual distributions to its hosting environment in response to identified deployment policy. The deployment policy may indicate when and under what conditions that a particular virtual distribution is to be initiated within a particular hosting environment as a VM. In some embodiments, each hosting orchestrator 302A and 302B may also be used to dynamically manage the VM during its life cycle within a hosting environment. Management policy may be used to provide the direction to the hosting orchestrators 302A and 302B on managing the VM's.

In an embodiment, the virtual distribution packaging and deployment system 300 may also include one or more virtual hosting distribution repositories 303A and 303B. The repositories 303A and 303B are implemented in the particular hosting environment to which it relates and for a particular one of the hosting orchestrators 302A or 302B. The repositories 303A and 303B include the virtual distributions in a library that permits them to be searched, stored, and retrieved within the hosting environments. This facilitates reuse.

According to an embodiment, the virtual distribution packaging and deployment system 300 may also include an enterprise identity service 304. The enterprise identity service 304 is implemented in a machine-accessible and readable medium and is to process on a particular enterprise machine within the enterprise environment. The enterprise identity service 304 provides authentication services and manages identities and in some cases policies for the virtual distributions and for the resources of the virtual distribution packaging and deployment system 300 as a whole. Example interactions permitting this were described in detail in the Identity Controlled Data Center application incorporated by reference herein. The enterprise identity service 304 supplies unique and verifiable identities to each virtual distribution and may also sign the virtual distribution configurations to ensure no modifications have occurred when the hosting orchestrators 302A and 302B attempt to activate the virtual distributions as VM's within the hosting environments.

Similarly, the virtual distribution packaging and deployment system 300 may include one or more hosting identity services 304A and 304B. Each hosting identity service 304A and 304B interact with its particular hosting orchestrator 302A and 302B to validate virtual distribution identities, verify signatures for virtual distribution configurations, and to perhaps supply permanent identities unique to the processing context of their hosting environments for their resources. The hosting identity services 304A and 304B interact over the WAN 310 with the enterprise identity service 304. Example interactions to perform validation and verification services were provided in detail with reference to the Identity Controlled Data Center incorporated by reference herein.

Figure 4:
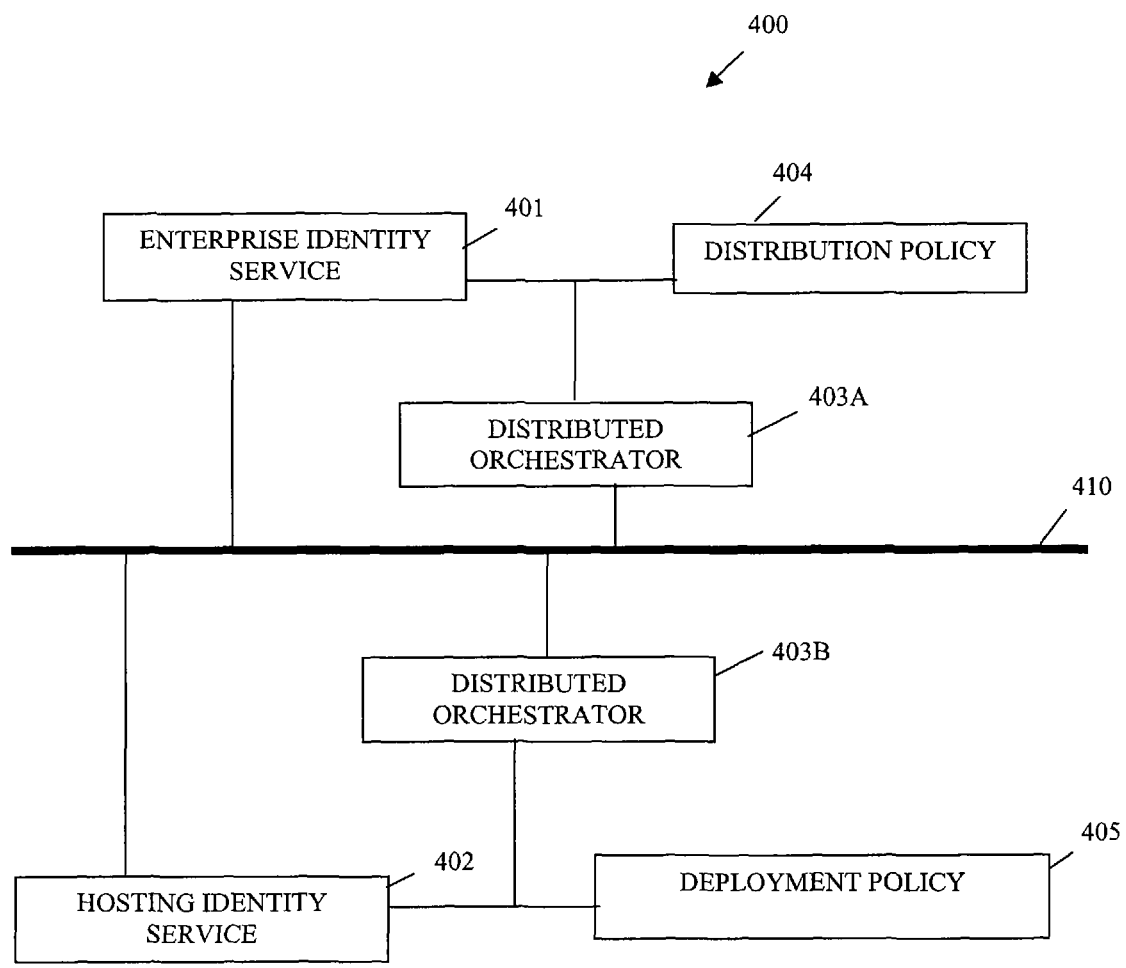
FIG. 4 is a diagram another virtual distribution packaging and deployment system, according to an example embodiment.

FIG. 4 is a diagram of another virtual distribution packaging and deployment system 400, according to an example embodiment. The virtual distribution packaging and deployment system 400 is implemented as instructions on or within a machine-accessible and readable medium. The instructions when executed by one or more machines perform enhanced processing depicted with respect to the methods 100 and 200 of the FIGS. 1 and 2, respectively. The virtual distribution packaging and deployment system 400 is also operational over a network 410 and the network 410 may be wired, wireless, or a combination of wired and wireless.

The virtual distribution packaging and deployment system 400 includes an enterprise identity service 401, a hosting identity service 402, and a distributed orchestrator 403A-403B. In some cases, the virtual distribution packaging and deployment system 400 may also include a distribution policy 404 and a deployment policy 405. Each of these and their interactions with one another will now be discussed in turn.

The enterprise identity service 401 supplies a unique and perhaps temporary access token or identity for a virtual distribution on behalf of a requesting distributed orchestrator 403A. The enterprise identity service 401 is implemented in a machine-accessible and readable medium and is to process on an enterprise machine within an enterprise environment. The enterprise identity service 401 may also be used to sign virtual distribution configurations. Additionally, the enterprise identity service 401 is used to provide validation and verification services to the distributed orchestrator 403B that processes remotely over a WAN 410 in a target hosting processing environment. The enterprise identity service 401 may also interact with the hosting identity service 402 over the WAN 410. Additionally, in some embodiments, the enterprise identity service 401 may be used to distribute the distribution policy 404 and perhaps, initially, the deployment policy 405.

The hosting identity service 402 is implemented in a machine-accessible and readable medium and is to process on a hosting environment machine. The hosting identity service 402 is in a trusted and secure relationship with the enterprise identity service 401. These two communicate securely with one another over the WAN 410 and authenticate to one another. The relationship between the two may be governed by a trust specification or contract. The hosting identity service 402 provides services to the distributed orchestrator 403B within the hosting environment by validating the initial identity of a particular virtual distribution, supplying a permanent identity for the virtual distribution for use within the hosting environment, verifying signatures for virtual distribution configurations, etc.

Example interaction and other features of the enterprise identity service 401 and the hosting identity service 402 was provided in detail in the Identity Controlled Data Center application incorporated by reference herein.

The distributed orchestrator 403A-403B is implemented in machine-accessible and readable media over a network on multiple machines. That is, a first aspect of the distributed orchestrator 403A is implemented within the enterprise environment for purposes of packaging and distributing a service and its content as a virtual distribution. Example processing for this aspect of the distributed orchestrator 403A can be found above with reference to the method 100 of the FIG. 1. Another aspect of the distributed orchestrator 403B is implemented within a hosting environment for purposes of deploying a virtual distribution to a host environment or host machine as a VM. Example processing for this aspect of the distributed orchestrator 403B can be found above with reference to the method 200 of the FIG. 2.

In an embodiment, the virtual distribution packaging and deployment system 400 may also include a distribution policy 404 implemented within the enterprise environment. The distributed orchestrator 403A that operates within the enterprise environment uses the distribution policy 404 to determine when and under what conditions that the virtual distribution is to be supplied to the distributed orchestrator 403B within the target hosting environment.

According to an embodiment, the distributed orchestrator 403A may use the distribution policy 404 to pre-deploy the virtual distribution from the enterprise environment to a hosting environment for a configured period or extended time before the virtual distribution is actually deployed or started as a VM within the hosting environment on a hosting machine to process the self-contained target service and its data content.

Similarly, the virtual distribution packaging and deployment system 400 may also include a deployment policy 405. The distributed orchestrator 403B that operates within the hosting environment uses the deployment policy 405 to determine when and under which conditions that the virtual distribution is to be started and initiated as a VM on a hosting machine.

The distributed orchestrator 403B manages deployed versions of the virtual distributions within the hosting environment in response to management or operational policy. Additionally, in some cases, the distributed orchestrator 403B may terminate a deployed version of the virtual distribution from within the hosting environment in response to a detected termination event.

Figure 5:
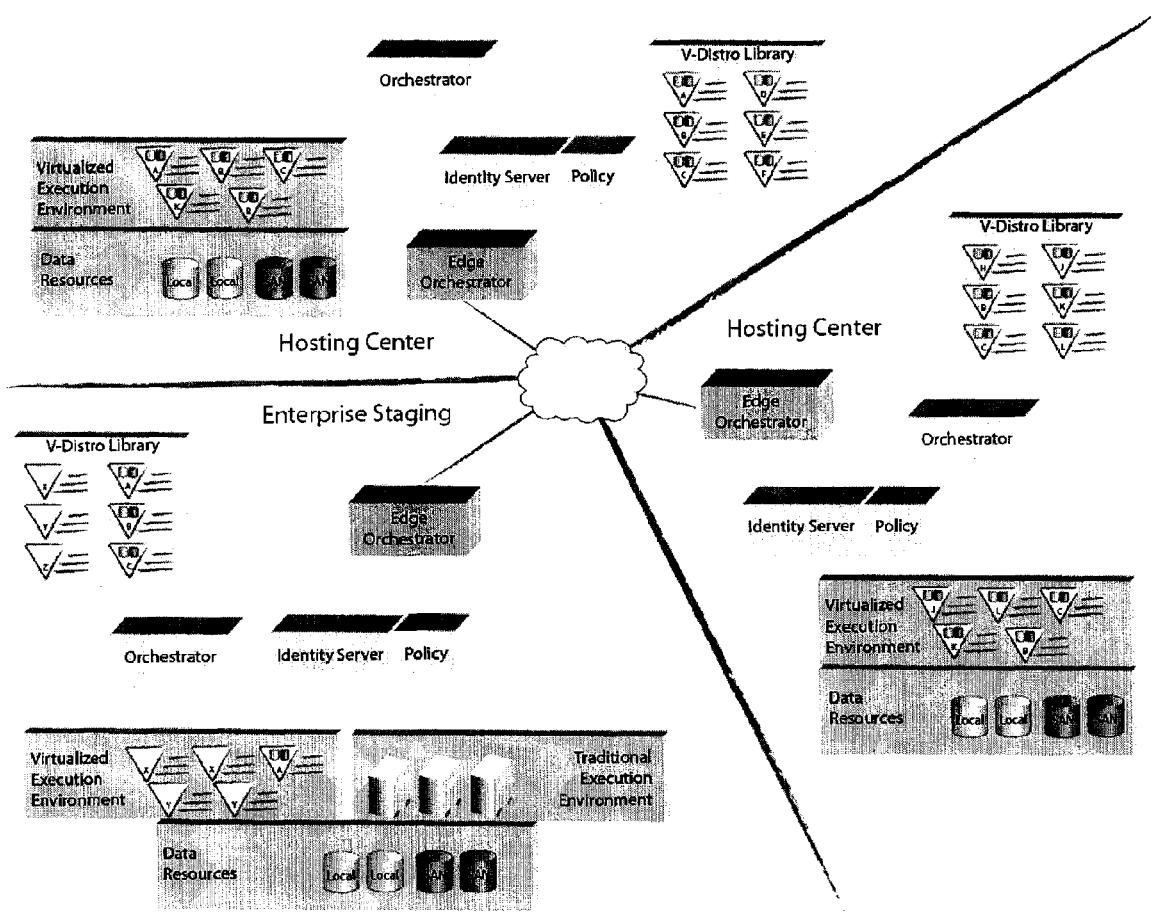
FIG. 5 is an example diagram of an architecture for the methods and systems described in FIGS. 1-4, according to an example embodiment.

FIG. 5 is an example diagram of an architecture for the methods 100 and 200 and systems 300 and 400 described in FIGS. 1-4, according to an example embodiment. It is noted that the components and arrangement or components is presented for purposes of illustration only and is not intended to limit the teachings herein to the particular architecture illustrated in the FIG. 5.

The architecture of the FIG. 5 illustrates a variety of components, such as edge orchestrators (one in an enterprise staging area discussed with reference to the method 100 and the FIG. 1 above and two in two separate hosting centers discussed with reference to the method 100 and the FIG. 2 above). The edge orchestrators as a whole were discussed with reference to the distributed orchestrator 403A and 403B of the FIG. 4.

The edge orchestrator at the enterprise stating area schedules and manages the copying of a populated or imaged virtual distribution from an enterprise virtual distribution library (V-Distro Library in the FIG. 5) to virtual distribution libraries at the specific hosting centers (again V-Distro Library in the FIG. 5 within the Hosting Center areas). Policy may be used to control the distribution of the virtual distributions from the edge orchestrator at the enterprise staging area to the hosting center edge orchestrators.

The edge orchestrators at the hosting centers provide the functions necessary to put a particular virtual distribution into the hosting center's virtual distribution library and to schedule the virtual distribution for execution in the virtualized execution environment, according to deployment policy.

Note that when a virtual distribution is executed that more policy can be applied to verify the appropriateness of the execution. Additionally, other policy can govern the actions of the executing virtual distribution (VM), such as termination policy, rescheduling policy, cloning policy, load balancing policy, load sharing policy, etc.

The virtual distribution executing as a VM executes just when policy states that is should and will, therefore, it will not execute when it should not according to policy (e.g., such as when a special time-sensitive offer has expired or elapsed according to a time zone that is being served, etc.).

One now appreciates how an entire and complete execution environment within the context of a specific service can be captured and imaged as a virtual distribution. This receives its own verifiable identity and policy can be used to dictate when it is distributed from an enterprise or source environment to edge networks or host environments. Deployment policy may be enforced in the host environments to dictate and drive when the virtual distribution will be initiated as a VM within the host environments. Policy can also drive when the VM is decommissioned. Existing data stores and programs do not have to be changed to provide for specialized processing; rather, the virtual distribution captured or imaged can provide all the specialized data/content and processing without changing the existing data/content and processing of the host environment in which the virtual distribution runs as a VM. Moreover, the processing services and data/content specific to a given target service can be pre-deployed to edge sites in preparation for usage. In fact, no changes to existing systems are needed at all for the tenets presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processing device implemented method for executing on a processing device, comprising:
    requesting, by an orchestrator executing on the processing device, a temporary access token from an identity service;
    generating, by the orchestrator, a request to establish a remote virtual processing environment on a target physical hosting environment authenticated by the identity service, wherein the request comprises the temporary access token;
sending, by the orchestrator, the request to a remote identity service on the target physical hosting environment, wherein the remote identity service contacts the identity service to authenticate the temporary access token;
imaging, by the orchestrator in response to receiving an acknowledgement from the target physical hosting environment a virtual distribution comprising a service and content for the target physical hosting environment;
acquiring, by the orchestrator, an identity for the virtual distribution from the identity service;
obtaining, by the orchestrator, a distribution policy for the virtual distribution defining under what conditions the virtual distribution is supplied to the target physical hosting environment; and
transmitting, by the orchestrator according to the distribution policy, the identity and the virtual distribution to a deployment service on the target physical hosting environment,
   wherein the distribution service authenticates the virtual distribution using the identity,
   wherein the deployment service acquires a deployment policy defining under what conditions the remote processing environment is to install the virtual distribution,
   wherein once the virtual distribution is installed on the target physical hosting environment it processes as a self-contained virtual machine (VM) having the service and the content, and
   wherein the deployment policy is enforced by the deployment service.

2. The method of claim 1, wherein imaging further includes recording and maintaining a specific processing context for the service within the virtual distribution.

3. The method of claim 1, wherein the distribution policy instructs the orchestrator to pre-distribute the virtual distribution over the network to the target physical hosting environment and provides an installation policy to an edge host installing service on the target physical hosting environment that specifies under what circumstances the virtual distribution is to be initiated as the VM within the target physical hosting environment.

4. The method of claim 3, further comprising providing one or more management policies with the installation policy for the edge host installing service to dynamically enforce against the VM within the target physical hosting environment.

5. The method of claim 1, wherein the service is one selected from a group consisting of a World-Wide Web (WWW) server service, a Hypertext Transfer Protocol (HTTP) proxy service, a content acceleration caching service, and an on-line commerce service.

6. The method of claim 1, wherein operating settings associated with the target physical hosting environment are used to configure and package the virtual distribution.

7. The method of claim 6, wherein the virtual distribution is signed by the identity service to assist in validation of the virtual distribution along with the identity at the target physical hosting environment.

8. A method, comprising:
receiving, by a local identity service executing on a target physical hosting environment, a request to establish a remote virtual processing environment from an orchestrator, wherein the request comprises a temporary access token;
authenticating, by the local identity service, the temporary access token by verifying the temporary access to token with an identity service;
sending, by the local identity service, an acknowledgement of the request to the orchestrator;
receiving, by the target physical hosting environment, a virtual distribution to install as a virtual machine (VM) on the target physical hosting environment, wherein the virtual distribution is received over a network from an enterprise edge staging service according to a distribution policy defining under what conditions the virtual distribution is supplied to the target physical hosting environment;
verifying an identity for the virtual distribution via interactions with the identity service;
identifying, by a deployment service executing on the target physical hosting environment, a deployment policy for the virtual distribution provided with the virtual distribution by the enterprise edge staging service once the identity is verified; and
deploying, by the deployment service according to the deployment policy, the virtual distribution as the VM within the target physical hosting environment once the identity is verified, wherein the deployment policy indicates under what conditions the virtual distribution is to be initiated in the target physical hosting environment and wherein the deployment policy is enforced by the deployment service.

9. The method of claim 8 further comprising, scheduling deployment of the virtual distribution when the deployment policy includes a temporal deployment limitation.

10. The method of claim 8 further comprising: identifying one or more management policies with the virtual distribution; and dynamically enforcing the one or more management policies against the VM when the VM is active on the target physical hosting environment.

11. The method of claim 8 further comprising: processing a request associated with one selected from a group consisting of rescheduling deployment of the virtual distribution, cloning the virtual distribution, moving the virtual distribution, terminating the virtual distribution, and load balancing resources used by the virtual distribution with other VM's.

12. The method of claim 8 further comprising, terminating the VM when it is deployed in response to a termination policy.

13. The method of claim 8, wherein deploying further includes encapsulating the VM as a self-contained service on the target physical hosting environment that is independent of other VMs and that includes its own self-contained data resources.

14. The method of claim 8, wherein deploying further includes activating the VM within the target physical hosting environment at a predefined date.

15. A system, comprising:
an enterprise machine that is a processing device for executing an enterprise orchestrator configured to:
   request a temporary access token from an enterprise identity service;
   generate a request to establish a remote virtual processing environment on a target physical hosting environment authenticated by the enterprise identity service, wherein the request comprises the temporary access token
   send the request to a remote identity service on the target physical hosting environment, wherein the remote identity service contacts the enterprise identity service to authenticate the temporary access token;

image a virtual distribution comprising a service and content for the target physical hosting environment;

acquire an identity for the virtual distribution from the enterprise identity service;

obtain a distribution policy for the virtual distribution defining under what conditions the virtual distribution is supplied to the target physical hosting environment; and transmit, according to the distribution policy, the identity and the virtual distribution to a deployment service on the target physical hosting environment, wherein the distribution service authenticates the virtual distribution using the identity, wherein the deployment service acquires a deployment policy defining under what conditions the remote processing environment is to install the virtual distribution, wherein once the virtual distribution is installed on the target physical hosting environment it processes as a self-contained virtual machine (VM) having the service and the content, and wherein the deployment policy is enforced by the deployment service.

16. The system of claim 15, wherein the enterprise orchestrator captures and images a particular processing context of the service for the virtual distribution.

17. The system of claim 15 further comprising: at least one hosting virtual distribution repository, wherein the at least one hosting virtual distribution repository is implemented in a particular hosting environment for a particular hosting orchestrator and includes a version of the virtual distribution.

18. The system of claim 15 further comprising, the identity service implemented in a machine-accessible medium, wherein the identity service supplies the identity for the virtual distribution and signs configurations for the virtual distributions on behalf of the enterprise orchestrator.

19. The system of claim 18 further comprising a plurality of hosting identity services, each hosting identity service is implemented in a machine-accessible medium and configured to process on a particular hosting machine, and wherein each hosting identity service interacts with the enterprise identity service to validate a particular unique identity for a particular virtual distribution and to verify a particular signed configuration for that particular virtual distribution.

20. The system of claim 15, wherein the service is one selected from a group consisting of a World-Wide Web (WWW) server service, a Hypertext Transfer Protocol (HTTP) Proxy service, a content acceleration caching service, and an on-line commerce service.

* * * * *

UNITED STATES PATENT AND TRADEMARK OFFICE
CERTIFICATE OF CORRECTION

| | | |
|---|---|---|
| PATENT NO. | : 8,370,915 B2 | Page 1 of 1 |
| APPLICATION NO. | : 11/692302 | |
| DATED | : February 5, 2013 | |
| INVENTOR(S) | : Carter | |

It is certified that error appears in the above-identified patent and that said Letters Patent is hereby corrected as shown below:

In the Specifications:

In column 1, line 38, before "access" delete "that".

In column 7, line 12, delete "(hereinafter" and insert -- hereinafter --, therefor.

In the Claims:

In column 13, line 10, in Claim 1, before "a" insert -- , --.

In column 14, line 2, in Claim 8, after "access" delete "to".

In column 14, line 26, in Claim 8, delete "environment" and insert -- environment, --, therefor.

Signed and Sealed this
Seventh Day of May, 2013

Teresa Stanek Rea
*Acting Director of the United States Patent and Trademark Office*